United States Patent
Huang et al.

(10) Patent No.: US 11,755,571 B2
(45) Date of Patent: Sep. 12, 2023

(54) CUSTOMIZED DATA SCANNING IN A HETEROGENEOUS DATA STORAGE ENVIRONMENT

(71) Applicant: PAYPAL, INC., San Jose, CA (US)

(72) Inventors: Jie Huang, Shanghai (CN); Zelin Yan, Shanghai (CN); Fuyuan Kang, Shanghai (CN); Gaoyuan Wang, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 16/768,525

(22) PCT Filed: May 13, 2020

(86) PCT No.: PCT/CN2020/090021
§ 371 (c)(1),
(2) Date: May 29, 2020

(87) PCT Pub. No.: WO2021/226875
PCT Pub. Date: Nov. 18, 2021

(65) Prior Publication Data
US 2023/0058870 A1 Feb. 23, 2023

(51) Int. Cl.
*G06F 16/00* (2019.01)
*G06F 16/245* (2019.01)
(Continued)

(52) U.S. Cl.
CPC ........... *G06F 16/245* (2019.01); *G06F 16/25* (2019.01); *G06F 16/285* (2019.01)

(58) Field of Classification Search
None
See application file for complete search history.

(56) References Cited

U.S. PATENT DOCUMENTS

| 11,080,423 B1* | 8/2021 | Kassam-Adams ..... G16H 15/00 |
| 2002/0143763 A1* | 10/2002 | Martin, Jr. .......... G06F 16/2282 |

(Continued)

FOREIGN PATENT DOCUMENTS

| CN | 106294499 | 1/2017 |
| CN | 106611035 | 5/2017 |
| WO | WO 2018080850 | 5/2018 |

OTHER PUBLICATIONS

International Application No. PCT/CN2020/090021, International Search Report and Written Opinion dated Feb. 18, 2021, 10 pages.

*Primary Examiner* — Anhtai V Tran
(74) *Attorney, Agent, or Firm* — Haynes and Boone, LLP

(57) ABSTRACT

Methods and systems are presented for performing data scanning in a heterogenous data storage environment. A data scanning process on multiple different data storages may be performed based on a data scanning request, which specifies certain data of interest to be detected during the scanning. First, sampled data records are scanned from each of the data storages. Based on analyzing the data in the sampled data records and the metadata associated with each data storage, a fingerprint may be generated for each of the data storages that indicates a likelihood that the data storage includes the data of interest. A second scan may be performed on the data storage only if the fingerprint exceeds a threshold. The data of interest may be detected in the data storages during the second scan of the selected data storages.

20 Claims, 7 Drawing Sheets

(51) Int. Cl.
*G06F 16/28* (2019.01)
*G06F 16/25* (2019.01)

(56) References Cited

U.S. PATENT DOCUMENTS

| | | | |
|---|---|---|---|
| 2003/0005087 A1* | 1/2003 | Bernhardt | G06F 16/2465 709/220 |
| 2012/0047112 A1* | 2/2012 | Steffan | G06F 16/93 707/662 |
| 2013/0117257 A1 | 5/2013 | Meijer et al. | |
| 2020/0065494 A1* | 2/2020 | Reich | G06F 21/577 |
| 2020/0387625 A1* | 12/2020 | Saad | G06F 21/6227 |
| 2021/0232700 A1* | 7/2021 | Sahib | G06F 21/335 |

\* cited by examiner

US 11,755,571 B2

CUSTOMIZED DATA SCANNING IN A HETEROGENEOUS DATA STORAGE ENVIRONMENT

CROSS REFERENCE TO RELATED APPLICATIONS

This application claims priority to International Application No. PCT/CN2020/090021, filed May 13, 2020, which is incorporated by reference in its entirety.

TECHNICAL FIELD

The present specification generally relates to data detection and/or classification, and more specifically, to scanning data in a heterogeneous data storage environment to detect and/or classify data according to various embodiments of the disclosure.

BACKGROUND

In this electronic age when data is abundant and storage mediums are inexpensive, it is common for organizations to collect data from different sources and store it in different types of data storages. For example, an organization, such as a merchant or a service provider, may store information associated with its customers and information related to every transaction processed by the organization. The organization may also store information associated with any interactions with its customers, such as communications with its customers in online chat sessions or phone calls, and online interactions such as webpages that the customers have visited, links that the customers selected, a duration of time when the customers are viewing certain products or services, etc.

As the data may be duplicated and/or stored across different data storages (e.g., different databases, different machines, different data centers, etc.), it becomes increasingly difficult for the organization to keep track of the types of data in its possession. In order to comply with the organization's own privacy policy and/or regulations imposed by the government, the organization needs to know what type of information (e.g., personal identifiable information, health information, etc.) is stored in each of the data storages. Exacerbating the problem, different jurisdictions may have different standards with respect to handling certain types of information. Thus, there is a need for developing a tool to detect and/or classify data in a heterogeneous data storage environment.

Figure 1:
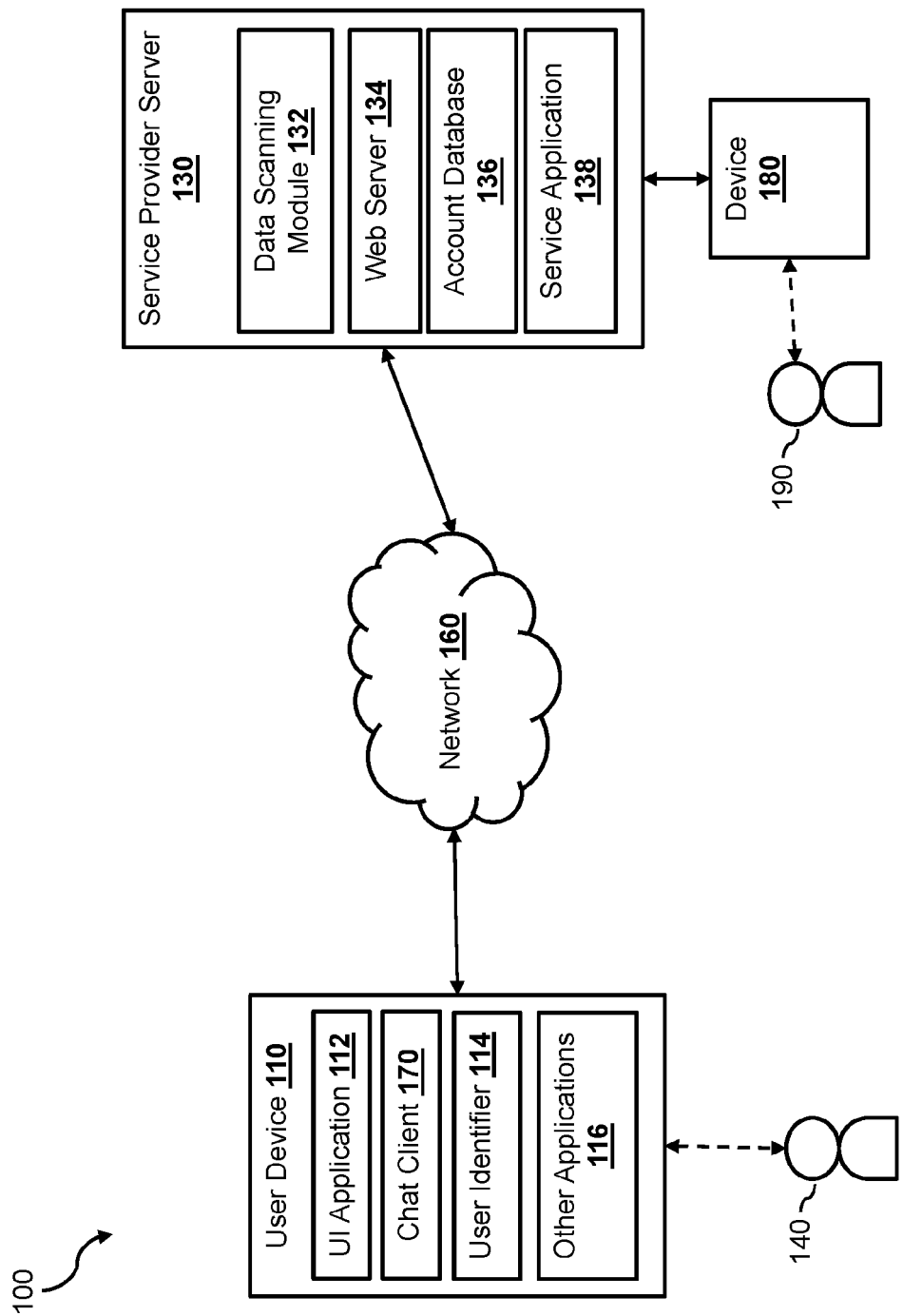
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for detecting and/or classifying various types of data in different data storages in a heterogenous data storage environment. As discussed above, organizations may obtain different types of data from many sources. An organization may obtain information associated with a user when the user registers an account with the organization (e.g., information such as a name, an identifier such as a social security number, an address, a financial account identifier (e.g., a credit card number, etc.), and other personal information). The organization may also obtain additional information related to the user as the user interacts with the organization. For example, the organization may record data associated with transactions conducted by the user with or through the organization (e.g., purchasing products and/or services from the organization, using a service offered by the organization, etc.). The organization may monitor interactions of the user with an interface of the organization, such as the user's online interaction with a website of the organization (e.g., data related to the browsing behavior of the user, etc.), the user's interaction with an application associated with the organization, the user's electronic communication (e.g., emails, etc.) with the organization, the user's conversation with an agent of the organization, etc.

As the organization grows in size, different groups (e.g., different departments) within the organization may organize, store, and duplicate the data in different manners. As such, the data obtained by the organization may be spread across multiple different machines or data centers and organized in different data storage formats (e.g., MySQL database, Oracle Relational Database Management Systems, SQL Servers, SAS, Hadoop, Teradata, Hbase, Druid, etc.). For example, a copy of the account information associated with the users may be stored in a structured relational database that is local to a first group of the organization, while a portion of the account information may be duplicated and stored in a different database (may also be in a different data structure and format) that is local to a second group of the organization. The different data storage formats may also include storing the data under different field names or in different arrangements. In one example, the account information that is stored by the first group may use the name "user_identifier" for the user identifier field, the name "first_name" for the first name field, and the name "last_name" for the last name field. The account information stored by the first group may be arranged in the order of user identifier, first name, and last name. On the other hand, the account information stored by the second group may use the name "user_ID" for the user identifier field, the name "f_name" for the first name field, and the name "l_name" for the last name field. The account information stored by the second group may be arranged in a different order, where the user identifier field comes first, followed by the last name field, and then the first name field. Meanwhile, other types of data such as emails, phone conversations, images, documents may be stored in an unstructured database (e.g., Hadoop). The variety of data formats and having no uniformity or standard in storing and organizing the data makes it a challenge for the organization to keep track of the data in its possession.

For reasons such as complying with government regulations related to data privacy (e.g., General Data Protection Regulation (GDPR), California Consumer Privacy Act (CCPA), Brazil General Data Protection Law, etc.) or fulfilling a request of a customer (e.g., requesting to access or remove certain data associated with the customer), the organization may be required to determine whether certain types of data (e.g., personal identifiable information (PII), health data, financial data, etc.) exist in any one of the data storages in its possession. For example, a government regulation may require the organization to implement a certain data protection protocol in data storages that include certain types of data, such as PII, health data, etc., that are associated with customers from particular regions (e.g., Germany, Ireland, etc.). In another example, a customer may request accessing or removing certain types of data (e.g., online browsing behavior data, etc.) associated with the customer.

Since the data is spread across multiple data storages and there are no uniform rules or standards for organizing the data, to comply with the government regulations and/or to fulfill the customers' requests, the organization may use a data scanning system to scan the data in each of the data storages for the requested data. The data scanning system may perform a scanning of data in the different data storages associated with the organization in response to receiving a request (e.g., a request to verify compliance with a government regulation, a request to access and/or remove data associated with a customer, etc.). As defined herein, a data storage means a collection of data that is organized and stored in a structured, a semi-structured, or unstructured manner. A data storage can be a database, a table within a database, or a memory space for storing specific types of data. The data storage may be accessed and the data within the data storage may be scanned by the data scanning system.

In some embodiments, the data scanning system may perform a complete scan of the data in all of the data storages associated with the organization. The complete scan may include accessing and analyzing data in each record or row of the data storages. Since every record within the data storages is accessed by the data scanning system, the complete scan provides a high accuracy in data detection and/or classification for the data storages. However, the time it takes to perform a complete scan can be long, especially when the number of data storages and the volume of data is large (e.g., may last hours or days). The time it takes to perform a complete scan of all of the records in the data storages may be expressed as the time it is required to scan a record (e.g., c) multiplied by the total number of records in the data storage (e.g., N). In certain situations, such as fulfilling multiple customers data requests or complying with different regulations associated with different jurisdictions, the time it takes to perform complete scans may become prohibitive (e.g., especially when N is large).

In some embodiments, in order to expedite the scanning of data, the data scanning system may take a sampling approach. Under the sampling approach, instead of accessing and analyzing every record or row in the data storages, the data scanning system may sample only a subset of data within each data storage. For example, the data scanning system may select, from a data storage, a subset of data records (e.g., randomly select, select according to a predetermined algorithm such as every $10^{th}$ record, etc.). The data scanning system may access and analyze only the subset of data records, and may determine the type of data that exists in the data storage (or classifying the data within the data structure) based on the analyzing of the subset of data records without accessing other records in the data storages. As one can imagine, scanning the data under the sampling approach may speed up the performance of detecting and/or classifying data within the data structure by multiple factors. The time required to scan data under the sampling approach may be expressed as the time required to scan one record (e.g., c) multiplied by the number of records selected to scan within the data storages (e.g., k). However, the trade-off for faster performance time is the reduction in accuracy in the data detection and/or classification. Under the sampling approach, the improvement in speed is directly proportional to the reduction of accuracy (e.g., less scanned data equates to faster response time but lower accuracy). Neither approaches provide both good speed and accuracy performance.

Thus, there is a need for a comprehensive data scanning framework for the organization that provides fast data scanning speed for scanning data in a heterogenous data storage environment while preserving accuracy of data detection and/or classification. According to various embodiments of the disclosure, the data scanning system may be configured to perform customizable data scanning for data detection and/or classification under a two-step approach. In the first step of the two-step approach, the data scanning system may sample data from each data storage, in a similar manner as the sampling approach. For example, the data scanning system may select, from each data storage, a subset of data records (e.g., randomly select, select according to a predetermined algorithm such as every $10^{th}$ record, etc.). In some embodiments, the data scanning system may select a predetermined number (or a predetermined percentage) of data records from each of the data storages. The data scanning system may access and analyze the selected subset of data records. For example, the data scanning system may determine whether the selected subset of data records includes data of a particular type (e.g., PII, health data, health data, financial data, etc.) associated with the request.

In some embodiments, in addition to analyzing the selected subset of data records, the data scanning system may analyze metadata associated with the data storage. The metadata may represent a format and/or organization of the data within the data storage. For example, the metadata may include a name of the data storage (e.g., a database name, a table name) and a type of data structure (e.g., relational database, unstructured database, NoSQL database, etc.), which may indicate to the data scanning system the types of data that may be included within the data structure. The data scanning system may determine that a data storage having a name "chat session Germany database" would likely include data associated with chat sessions conducted with German customers while a data storage having a name "User Online Behavior US" would likely include data related to online behaviors of customers from the United States.

The metadata may also include field names (e.g., column names) associated with the fields within the data storage. In some embodiments, by analyzing the field names of the data storage, the data scanning system may determine whether the data storage may likely include data of the particular type (or determine a probability that the data storage includes data of the particular type). For example, when the metadata indicates that the data storage includes a field having a name "SSN", the data scanning system may determine that the data storage includes personal identifiable information (e.g., in the form of a social security number). The metadata may also include other data such as a table size (e.g., a number of records within the table) and latest update time (e.g., the time when the table was last updated).

In some embodiments, in order to determine whether the data included within the subset of data records is associated with a customer and/or a particular geographical region/jurisdiction, the data scanning system may be required to determine an origin of the data (e.g., the user or user information associated with the data). For example, when the request for the data scan is associated with complying with a data privacy regulation of a jurisdiction, the data scanning system may need to determine whether the data storage includes data of users from that jurisdiction. In another example, when the data scan request is to fulfill a customer's request to access and/or remove sensitive data associated with the customer, the data scanning system may need to determine whether the data storage includes data associated with that customer.

In some embodiments, the data scanning system may determine whether the subset of the data records indicates the origin of the data based on analyzing the subset of data records and/or the field names (e.g., include an identifier associated with the user, include a field indicating a residency, a citizenship, or an address of a user associated with the data in the record, etc.). However, as discussed herein, since data may be duplicated and stored in different data storages, the selected subset of data record in the data storage being scanned may not include data that indicates the origin of the data. As such, the data scanning system may correlate data across multiple data storages to identify a user associated with the data (or a geographical region/jurisdiction with which a user associated) within the selected subset of data records. For example, the data scanning system may determine whether the data in the selected subset of data records include data values that may be a primary key to other data storages, such as a user account identifier, a chat session identifier, an email session identifier, or other types of keys (e.g., a field that is indicated as a secondary key may correlate to a primary key of another data storage). The data scanning system may then use the data values as a primary key to retrieve data from one or more other data storages. Based on the data retrieved from the one or more other data storages, the data scanning system may determine an origin of the data in the selected subset of data records.

Based on the information obtained from the subset of data records, the information derived by the data scanning system from the subset of data records (e.g., data from another data structure that correlates to the subset of data records) and the metadata, the data scanning system may generate a data fingerprint for the data storage. The data fingerprint may indicate a percentage of data associated with a particular geographical region or jurisdiction, a percentage of data associated with the particular type of information (e.g., PII, health information, financial information, etc.), a percentage of the data within the data storage that has been updated within a predetermined amount of time (e.g., a month, a year, since the data has been inserted into the data structure, etc.), the time when the data storage was last updated, and a size of the data storage (e.g., a number of records within the data storage).

By sampling subsets of data records in the data structures and analyzing the metadata of the data structures, the data scanning system may generate a data fingerprint for each data storage using the techniques described herein for the first step of the two-step approach. In the second step of the two-step approach, the data scanning system may determine whether to perform additional scanning for one or more of the data storages based on the data fingerprint generated for the data storages. In some embodiments, the data scanning system may compare the data fingerprints to a threshold. For example, the threshold may include threshold values corresponding to one or more attributes represented by the data fingerprint, such as a threshold value corresponding to the percentage of data in the subset of data records that is associated with the particular type of information (e.g., PII, health data, financial data, etc.), a threshold value corresponding to a percentage of data having a particular origin (e.g., associated with a user, associated with a particular jurisdiction, etc.), and a threshold value corresponding to a ratio between a size of the subset of data records and a size of the data storage. The data scanning system may determine to perform additional scanning for a data storage when the data fingerprint generated for the data storage exceeds the threshold.

In some embodiments, the data scanning system may determine whether a previous classification and/or detection has been determined for a particular data storage (e.g., based on a previous scanning of the particular data storage). The data scanning system may compare the time that the previous classification and/or detection was performed against a time that the particular data storage has been last updated (and/or determine a percentage of the data that has been updated since the time that the previous classification was performed). The data scanning system may also determine whether to perform additional scanning for the particular data storage based on the comparing of the times and/or the percentage of the data that has been updated since the previous classification and/or detection. For example, if the data scanning system determines that the particular data storage was last updated before the previous classification and/or detection was performed or that the percentage of data that was updated since the last classification and/or detection was performed is below a threshold (e.g., 10%), the data scanning system may determine not to perform the additional scan for the particular data storage (even though the derived fingerprint exceeds the threshold), and use the information generated from the previous classification and/or detection instead.

When the data scanning system determines to perform an additional scan for a data storage, the data scanning system may select additional records (e.g., additional rows) of data from the data storage for scanning. In some embodiments, the data scanning system may scan the entire data storage when the fingerprint of the data storage exceeds the threshold. In other embodiments, the data scanning system may select additional subsets of data records from the data storage for scanning. The data scanning system may iteratively select additional subsets of data records for scanning, and generate an updated data fingerprint for the data storage based on all of the scanned records until (1) the entire data storage is scanned or (2) the updated data fingerprint falls below the threshold. The time required to perform data scanning under the two-step approach can be expressed as $c*k+a*f*N*c$, where a represents a percentage of the data storages having data fingerprints exceeding the threshold and f represents the number of columns within the data storages that are related to the particular type of information.

Different embodiments may use different techniques to determine the threshold. In some embodiments, the data scanning system may include predetermined threshold values for different types of requests. Thus, the data scanning system may include a threshold value for requests to scan for compliance with regulations associated with each jurisdiction. The data scanning system may include another threshold value for requests to access information associated with a user and a threshold for requests to remove information associated with a user (e.g., forget me requests). In some embodiments, the data scanning system may provide an interface that enable a person who submits the data scanning request (e.g., a privacy officer associated with the organization) to customize the scanning process. Since one aspect of the performance (e.g., speed, accuracy, confidence level, etc.) of the data scanning may affect another aspect of the performance (e.g., faster the process, the lower the accuracy, etc.), the data scanning system may enable the person to specify a priority (or different weights) of the different aspects (e.g., speed, accuracy, and confidence level). For example, the interface may enable the person to specify, from a scale (e.g., 1-10, 1-100, etc.) an importance score for each of the different performance aspects. The data scanning system may then determine the threshold values based on the inputs from the person. For example, the data scanning system may determine lower threshold values when the inputs specify a higher importance on speed than accuracy and confidence level, whereas the data scanning system may determine higher threshold values when the inputs specify a higher importance on accuracy and confidence level than speed.

Accordingly, with higher threshold values (e.g., accuracy and confidence level being more important than speed), the data scanning system may be configured to perform a higher number of thorough (e.g., complete) scanning (e.g., more data storages are scanned entirely during the second step), and with lower threshold values (e.g., speed being more important than accuracy and confidence level), the data scanning system may be configured to perform a lower number of thorough (e.g., complete) scanning (e.g., less data storages are scanned entirely during the second step). This way, the data scanning system provides an efficient, yet customizable, data scanning across multiple heterogenous data structures.

FIG. 1 illustrates an electronic transaction system 100 within which the data scanning system may be implemented according to one embodiment of the disclosure. The electronic transaction system 100 includes a service provider server 130 associated with a service provider and a user device 110 that may be communicatively coupled with each other via a network 160. The service provider server 130 may be communicatively coupled with a device 180 directly or via an internal network associated with the service provider. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the service provider server 130 and/or other user devices similar to the user device 110 over the network 160. For example, the user 140 may use the user device 110 to log in to a user account with the service provider to access account services or conduct electronic transactions (e.g., account transfers or payments, purchase goods and/or services, sales of goods and/or services, receive payments of the sale, etc.) with the service provider server 130. Furthermore, the user 140 represented here may be a natural person, a group of people, a community, and/or a business entity. Examples of business entities include merchant sites, resource information sites, utility sites, real estate management sites, social networking sites, etc., which offer various items for purchase and process payments for the purchases.

The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser), which may be utilized by the user 140 to conduct electronic transactions (e.g., electronic payment transactions, logging in to a user account, viewing transactions, etc.) with the service provider server 130 over the network 160. In one implementation, the user interface application 112 includes a software program, such as a graphical user interface (GUI), executable by a processor that is configured to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110 may include components for facilitating communications between the user 140 and the service provider server 130 (or an agent of the online service provider). For example, the user device 110 may include a chat client 170 for facilitating online chat sessions with another chat client (e.g., a chat robot, etc.) associated with the service provider server 130. The chat client 170 may be a software application executed on the user device 110 for providing a chat client interface for the user 140 and for exchanging (e.g., transmitting and receiving) messages with the other chat client. For example, during an online chat session with the chat client 170, the chat client 170 may present a chat interface that enables the user 140 to input data (e.g., text data such as utterances, audio data, multimedia data, etc.) for transmitting to another chat client. The chat interface may also present messages that are received from another chat client. In some embodiments, the messages may be presented on the chat client interface in a chronological order according to a chat flow of the online chat session. The chat client 170 may be an embedded application that is embedded within another application, such as the UI application 112. Alternatively, the chat client 170 may be a stand-alone chat client program (e.g., a mobile app such as WhatsApp®, Facebook® Messenger, iMessages®, etc.) that is detached from any other software applications executed on the user device 110.

The user device 110, in various embodiments, may include other applications 116 as may be desired in one or more embodiments of the present disclosure to provide additional features available to the user 140. For example, the user device 110 may include an email client that enables the user 140 to transmit and receive email messages with others, such as the service provider server 130. The user device may also include a phone application for facilitating an audio call (e.g., a phone call, a voice-over-IP call, etc.) with another person (e.g., an agent associated with the online service provider).

The applications 116 may also include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. The identifier 114 may include one or more attributes related to the user 140 of the user device 110, such as personal information related to the user (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the identifier 114 may be embedded within messages transmitted to other chat clients (e.g., the chat client 182 or the chat robot) via an online chat session, and the identifier 114 may be used by the service provider server 130 to associate the user with a particular user account maintained by the service provider server 130.

In various implementations, the user 140 is able to input data and information into an input component (e.g., a keyboard) of the user device 110 to provide user information with a transaction request, such as a login request, a fund transfer request, a request for adding an additional funding source (e.g., a new credit card), or other types of request. The user information may include user identification information.

Even though only one user device 110 is shown in FIG. 1, it has been contemplated that one or more user devices (each similar to user device 110) may be communicatively coupled with the service provider server 130 via the network 160 within the system 100.

The service provider server 130, in one embodiment, may be maintained by an online service provider, which may provide services (e.g., selling of merchandise processing, performing electronic transactions, performing electronic payment transactions, etc.). As such, the service provider server 130 may include a service application 138, which may be adapted to interact with the user devices (such as the user device 110) over the network 160 to facilitate the electronic transaction services, and/or other services offered by the service provider server 130. In one example, the service provider server 130 may be provided by PayPal, Inc., of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include a web server 134 that is configured to serve web content to users in response to HTTP requests. As such, the web server 134 may include pre-generated web content ready to be served to users. For example, the web server 134 may store a log-in page and is configured to serve the log-in page to users for logging into user accounts of the users to access various services provided by the service provider server 130. The web server 134 may also include other webpages associated with the different services offered by the service provider server 130. As a result, a user (e.g., the user 140) may access a user account associated with the user and access various services offered by the service provider server 130, by generating HTTP requests directed at the service provider server 130.

The service provider server 130, in one embodiment, may be configured to maintain one or more user accounts (e.g., a buyer account, a seller account, etc.) in an account database 136, each of which may include account information associated with one or more users (e.g., the user 140 associated with user device 110). For example, account information may include private financial information of users and merchants, such as one or more account numbers, passwords, credit card information, banking information, digital wallets used, transaction history, or other types of financial information. In certain embodiments, account information also includes user purchase profile information such as account funding options and payment options associated with the user, payment information, receipts, and other information collected in response to completed funding and/or payment transactions. In some embodiments, the service provider server 130 may also include one or more additional data storages for storing various data associated with the users, such as online behavior data of the users, session data associated with chat sessions, email sessions, phone call sessions, and other data obtained from various sources (e.g., interactions with users). As discussed herein, the data obtained by the service provider server 130 may be stored and/or duplicated across a variety of data storages and may be stored under different data arrangements and formats.

The service provider server 130 may also include a data scanning module 132 that implements the functionality of the data scanning system as disclosed herein. In some embodiments, the data scanning module 132 may be configured to perform a data scan on the different data storages associated with the online service provider 130 based on a data scanning request. The data scanning request may be associated with detecting whether certain data (e.g., data of interest) exists in any of the data storages. For example, the data scanning request may be associated with compliance with a data privacy regulation of a jurisdiction (e.g., General Data Protection Regulation (GDPR), California Consumer Privacy Act (CCPA), Brazil General Data Protection Law, etc.) or a customer's request for accessing and/or removing data associated with the customer (e.g., a forget me request). Thus, the data scanning request may specify two attributes related to the data of interest—(1) a type of data associated with the request (e.g., PII, health data, financial data, or other types data of interest) and (2) a data origin such as a user or a user account with the service provider server 130 or a geographical region/jurisdiction (e.g., Brazil, California, Europe, China, etc.).

In some embodiments, the data scanning module 132 may provide a framework for performing efficient and customizable data scanning over the data storages associated with the service provider server 130. Based on the request, the data scanning module 132 may be configured to scan data in the data storages under the two-step approach as described herein. In the first step of the two-step approach, the data scanning module 132 may perform a sampling scan for each of the data storages. For example, the data scanning module 132 may select, for each of the data storages, only a subset of data records for scanning. The data scanning module 132 may analyze the subset of data records and the metadata associated with the data storage to determine whether the data storage includes the data of interest specified in the request. The data scanning module 132 may generate a data fingerprint for each data storage based on the sampling scan.

In some embodiments, the data scanning module 132 may determine, based on the fingerprint generated for each of the data storages, whether to perform an additional scan (e.g., a complete scan) for each individual data storage in the second step of the two-step approach. For example, the data scanning module 132 may compare the data fingerprint of a data storage with predetermined threshold values. The data scanning module 132 may determine to perform an additional scan for a data storage when the data fingerprint of the data storage exceeds the threshold values, indicating that the probability of the data storage including the data of interest is high. The data scanning module 132 may determine not to perform an additional scan for a data storage when the data fingerprint of the data storage does not exceed the threshold values, indicating that the probability of the data storage including the data of interest is low. This way, the data scanning module 132 may accurately detect (e.g., 99% or above accuracy) the data of interest in each of the data storages without performing a complete scan to all of the data storages.

When it is detected that the data of interest exists in a data storage, the service provider server 130 may perform an action associated with the data (e.g., providing the data to a user device, deleting the data from the data storage, sending an alert to an agent of the service provider server regarding the existence of the data of interest in the data storage, etc.).

Figure 2:
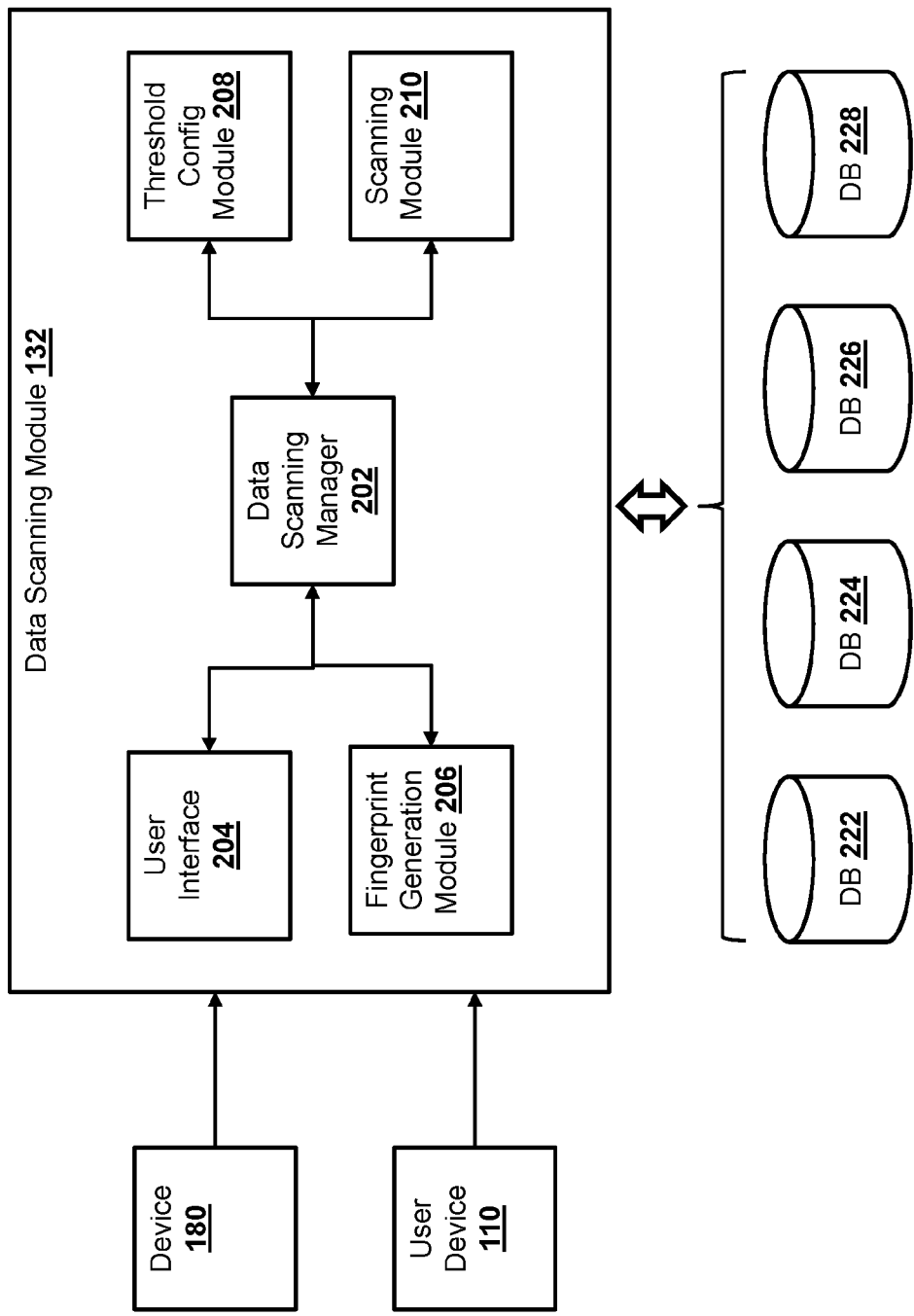
FIG. 2 is a block diagram illustrating a data scanning module according to an embodiment of the present disclosure.

FIG. 2 illustrates a block diagram of the data scanning module 132 according to an embodiment of the disclosure. The data scanning module 132 includes a data scanning manager 202, a user interface module 204, a fingerprint generation module 206, a threshold configuration module 208, and a scanning module 210. The data scanning module 132 may be communicatively coupled with one or more data storages (e.g., data storages 222-228) that are associated with the service provider server 130. The data storages 222-228 may include databases, tables, and other structured, semi-structured, and/or unstructured data storages for storing data obtained by the service provider server 130. For example, the data storages 222-228 may include the account database 136 for storing user account data. Thus, some of the data stored in the data storages 222-228 may include information of each of the users of the service provider server 130 such as a name, an identifier such as a social security number, an address, a financial account identifier (e.g., a credit card number, etc.), and other personal information that may fall within the type of data that is regulated under data privacy regulations of various jurisdictions and information that a user may want to access and/or remove from the service provider server 130. The information may be obtained by the service provider server 130 during a registration process of user accounts or through interactions with the users.

For example, the service provider server 130 may obtain additional information related to the user as the user interacts with the service provider server 130. In some embodiments, the service provider server 130 may record data associated with transactions conducted by the user with the service provider server 130 (e.g., purchasing products and/or services, using a service such as a payment service facilitated by the service provider server 130, etc.) in one or more of the data storages 222-228. The service provider server 130 may monitor and record in one or more of the data storages 222-228 interactions of the user with an interface provided by the service provider server 130, such as the user's online interaction with a website hosted by the web server 134 (e.g., data related to the browsing behavior of the user, etc.), the user's interaction with an application associated with the service provider server 130, the user's electronic communication (e.g., emails, etc.) with the organization, the user's conversation with an agent of the organization, etc. During the user's interactions with the service provider server 130, the user may provide personal information (e.g., social security numbers, health information, financial information, etc.) to the service provider server 130, and the service provider server 130 may intentionally or inadvertently store the information along with other non-personal information in one or more of the data storages 222-228. For example, during an online chat session, the user may transmit a message that includes a bank account number, a social security number, or other information to the service provider server 130. The service provider server 130 may store the entire online chat session (which includes the personal information) in an unstructured database (e.g., Hadoop). Since the personal information from the online chat session is not categorized, indexed, or otherwise tagged, the service provider server 130 may not be aware that personal information is hidden within the online chat session data stored in one or more of the data storages 222-228.

Furthermore, as discussed herein, as the online service provider grows in size, different groups within the online service provider may duplicate and store different data under different data formats and arrangements across the data storages 222-228. These factors make it challenging for the online service provider to determine and/or locate certain data of interest within the data storages 222-228 in its possession. Thus, according to various embodiments, the data scanning module 132 may be configured to perform an efficient and customizable data scanning across the data storages 222-228 for detecting and/or classifying data within the data storages 222-228 based on a data scanning request. The data scanning request may be associated with detecting whether certain data (e.g., data of interest) exists in any of the data storages 222-228. For example, the data scanning request may be associated with compliance with a data privacy regulation of a jurisdiction (e.g., General Data Protection Regulation (GDPR), California Consumer Privacy Act (CCPA), Brazil General Data Protection Law, etc.) or a customer's request for accessing and/or removing data associated with the customer (e.g., a forget me request).

In some embodiments, the user interface module 204 may provide an interface on a device (e.g., the device 180 or the user device 110) for submitting a data scanning request. For example, the user 140, through the user device 110, may submit a forget me request for removing all of the data associated with the user 140. In some embodiments, the user 140, through the user device 110, may directly submit the forget me request to scan the data within the data storages 22-228. Alternatively, the service provider server 130 may receive the forget me request from the user device 110, and may in turn generate and transmit a data scanning request through the interface provided by the user interface module 204 based on the forget me request. In another example, the interface may be provided on the device 180 associated with an agent of the service provider server 130 (e.g., a data privacy officer of the online service provider). Through the interface provided on the device 180, the agent may submit a data scanning request to detect any data of interest located in any one of the data storages 222-228 for verifying compliance of certain privacy-related regulations associated with a jurisdiction. The agent may submit such a request periodically to monitor and detect any incompliance of regulations such that remediation efforts can be performed in a timely manner.

The interface provided by the user interface module 204 may enable a person or a machine submitting the data scanning request to specify different attributes associated with the data of interest (e.g., data to be detected within the data storages 222-228), which may include one or more particular types of information to be detected (e.g., PII, health information, financial information, or other types of data) and a data origin (e.g., a user or a user account, a geographical region/jurisdiction, etc.).

In some embodiments, the data scanning module 132 may enable the person or the machine submitting the data scanning request to customize the performance of the data scanning process. For example, the interface provided by the user interface module 204 may also enable the person or the machine submitting the data scanning request to specify a priority of different performance aspects of the data scanning process (e.g., speed, accuracy, confidence level, etc.). In some embodiments, the interface may enable the person to provide different weights (e.g., importance level) for the different performance aspects, for example, over a predetermined scale (e.g., 1-10, 1-100, etc.). In some embodiments, the priority of the different performance aspects may be used by the threshold configuration module 208 to configure threshold values for processing the data scanning request, which will be discussed in more details below.

Figure 3A:
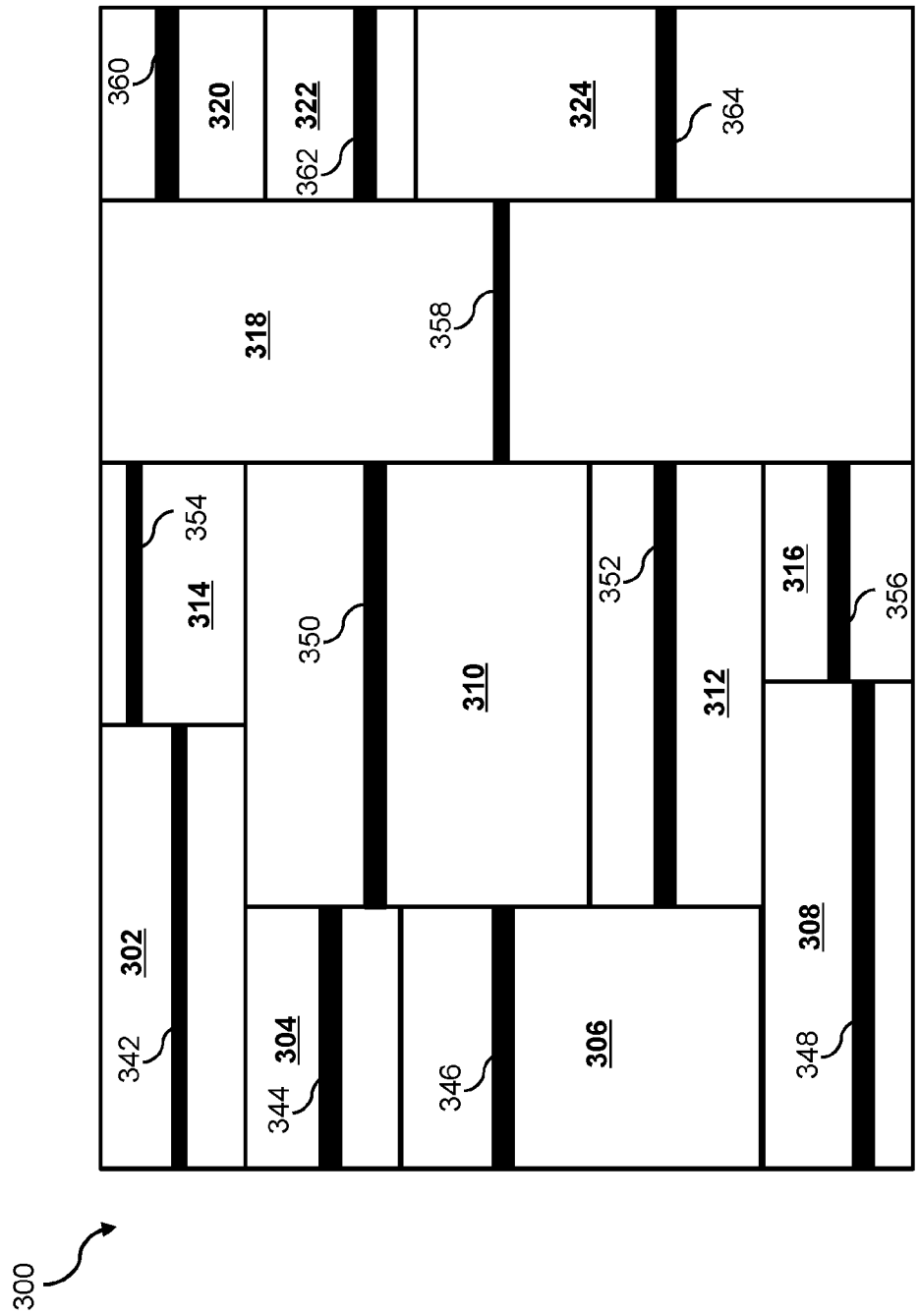
FIGS. 3A-3C illustrate records being scanned by the data scanning module under the two-step approach according to an embodiment of the present disclosure.
Figure 3B:
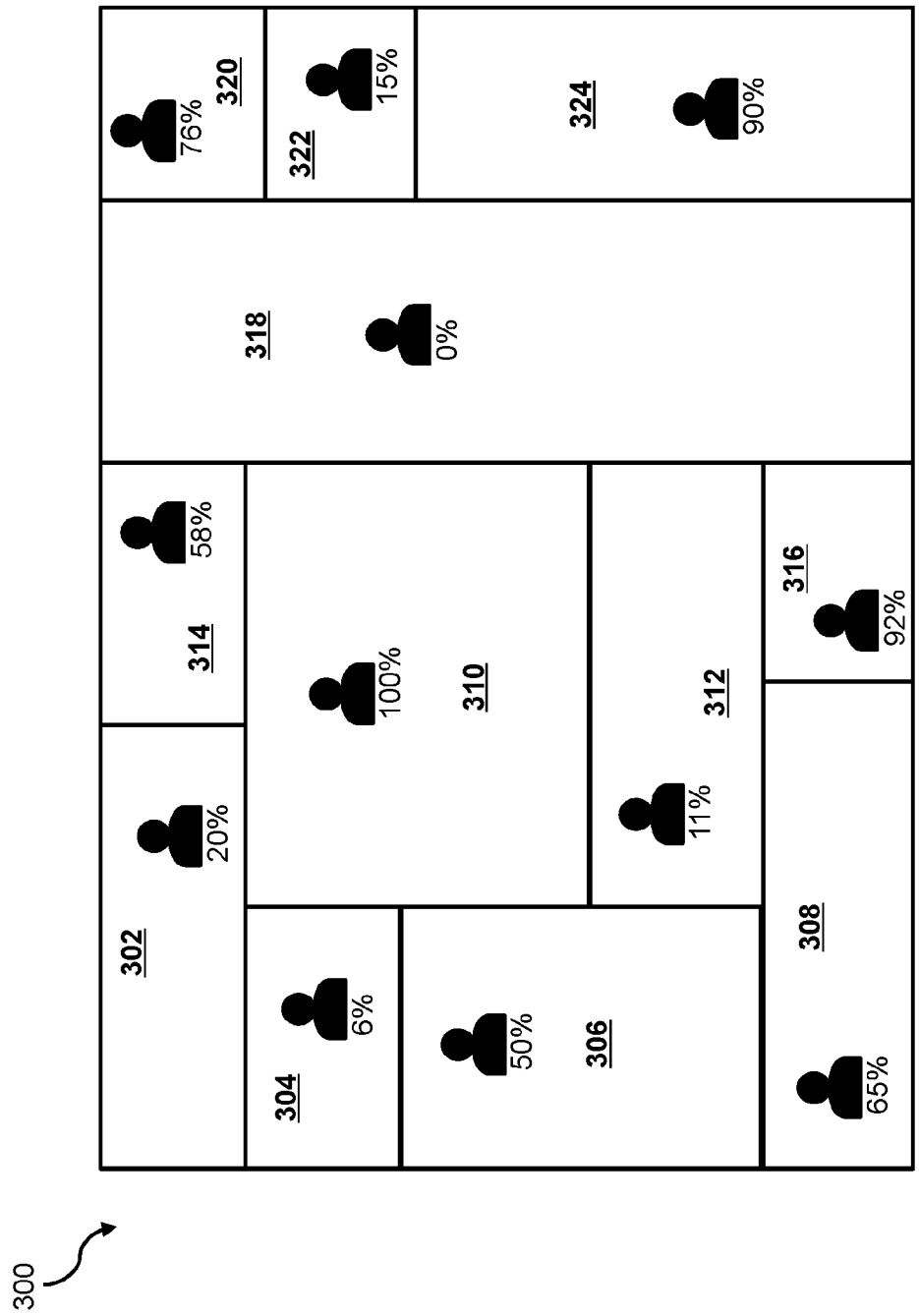
Figure 3C:
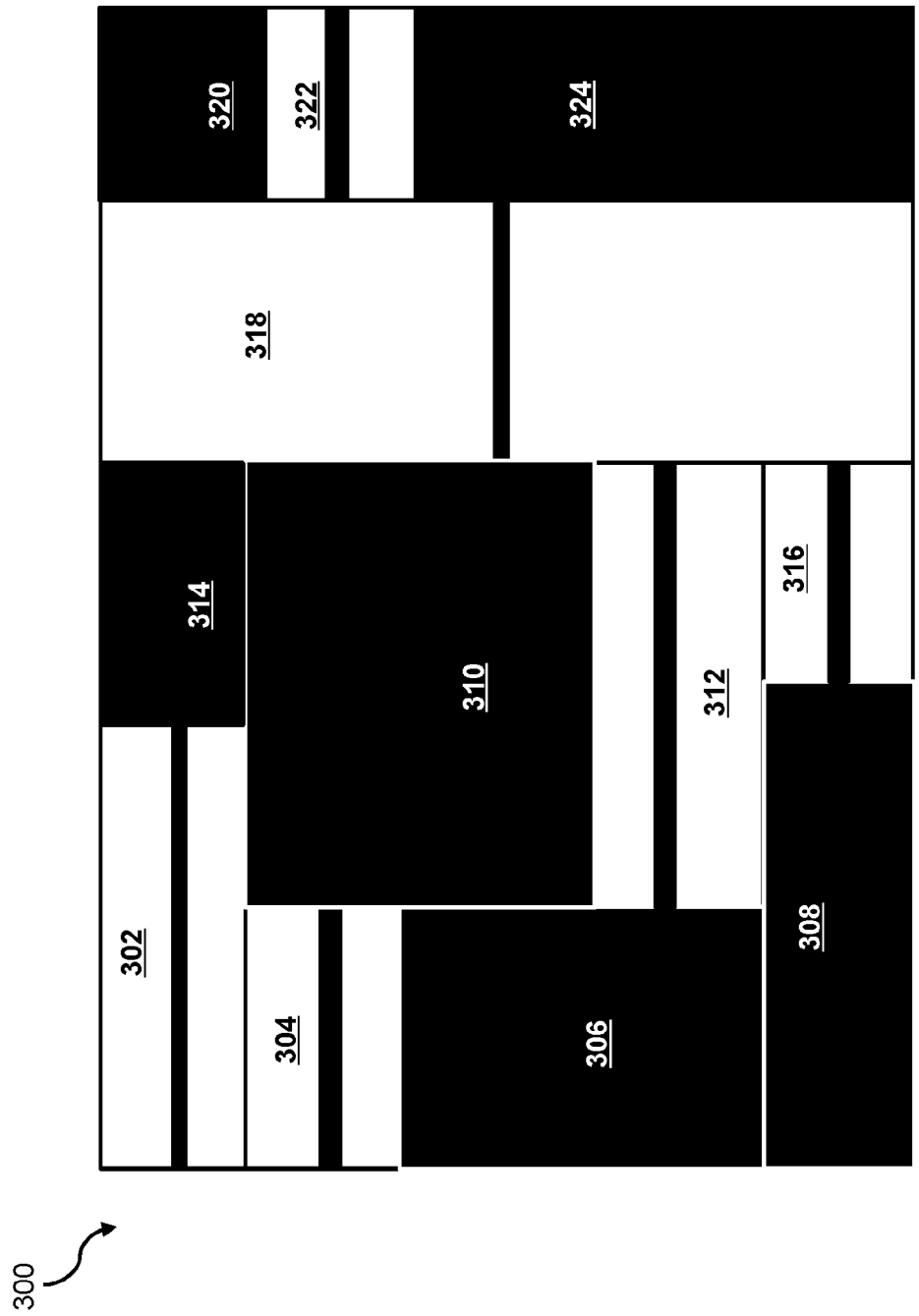

Based on the data scanning request, the data scanning manager 202 may instruct the scanning module 210 to first perform an initial scan (e.g., a sampling scan) on all of the data storages 222-228 (as part of the first step of the two-step approach). During the initial scan of the data storages 222-228, the scanning module 210 may select a subset of data records within each of the data storages 222-228 for scanning. FIGS. 3A-3C illustrate records 300 having multiple data storages 302-324 associated with the service provider server 130 according to different embodiments. Some or all of the data storages 302-324 may correspond to the data storages 222-228 in different embodiments. The service provider server 130 may store data obtained from various sources (e.g., user interactions with a website, online chat sessions, emails, phone calls, etc.) in the data storages 302-324. The data storages 302-324 may be configured to store data in a variety of different data structures and different data organizations/arrangements. For example, one or more of the data storages 302-324 may include a relational database system (e.g., Oracle database system) that stores data in a structured data structure while one or more other of the data storages 302-324 may include an unstructured database (e.g., Hadoop). Furthermore, as data may be duplicated across different data storages, the same data may be stored in different formats (e.g., associated with a different field name, in a different order) across the data storages 302-324.

In some embodiments, instead of scanning every data records in each of the data storages 302-324, the scanning module 210 may be configured to select only a subset of data records in each of the data storages 302-324 for scanning during the initial scan. For example, in FIG. 3A, the scanning module 210 may select, from the data storage 302, a subset of data records 342 for scanning. The scanning module 210 may also select subsets of data records 344-364 from the data storage 304-324, respectively, for scanning. Different embodiments of the scanning module 210 may use different techniques to select the subset of data records for scanning. In some embodiments, the scanning module 210 may select a predetermined fixed number (or percentages) of data records from each of the data storages 304-324. In some embodiments, the scanning module 210 may determine a number (or a percentage) of data records to select based on attributes of the data storage. For example, the scanning module 210 may determine a higher number or percentage of data records when the attributes of the data storage (e.g., a name of the data storage, a description of the data storage) indicates that the data included in the data storage likely has the data of interest and the scanning module 210 may determine a lower number or percentage of data records when the attributes of the data storage (e.g., a name of the data storage, a description of the data storage) indicates that the data included in the data storage likely does not have the data of interest.

In some embodiments, the scanning manager 202 may also determine whether a partial scan (e.g., a sampling scan) or a complete scan has been previously performed for each one of the data storages before scanning the data storages. Whenever a data fingerprint is generated for a data storage, the scanning manager 202 of some embodiments may store the data fingerprint (along with a timestamp associated with the data fingerprint) in a database and associate the data fingerprint with the data storage. If a complete scan is performed on the data storage, the scanning manager 202 may also generate a label for the data storage (representing the result of the complete scan) and store the label along with a timestamp in the database as well. Thus, scanning manager 202 may access the database to determine whether an existing data fingerprint and/or a label exists for the data storage. If a past data fingerprint and/or a label associated with the data storage exists in the database, the fingerprint generation module 206 may generate the data fingerprint based on the past fingerprint and/or the label. For example, if it is determined that no data has been updated (or a portion of the data below a threshold) has been updated in the data storage since the past fingerprint or label was determined for the data storage, the fingerprint generation module 206 may use the past fingerprint without re-scanning the data storage.

The scanning module 210 may then scan only the selected subset of data records 342-364 from the data storages 302-324. After accessing/retrieving the selected subset of data records 342-364, the fingerprint generation module 206 may analyze the data included in the selected subset of data records 342-364. For example, the fingerprint generation module 206 may determine one or more attributes of the data storage based on analyzing the subset of data records in the data storage. The fingerprint generation module 206 may compute a percentage of data associated with the particular type of information specified in the data scanning request (e.g., PII, health information, financial information, etc.) within the subset of data records, a percentage of data associated with an origin specified in the data scanning request (e.g., a particular user account, a particular geographical region or jurisdiction, etc.) within the subset of data records, and a ratio between the selected subset of data records and the entire data storage (e.g., the total number of records in the data storage).

In some embodiments, the fingerprint generation module 206 may determine whether the subset of the data records indicates the origin of the data based on analyzing the subset of data records and/or the field names (e.g., include an identifier associated with the user, include a field indicating a residency, a citizenship, or an address of a user associated with the data in the record, etc.). However, as discussed herein, since data may be duplicated and stored in different data storages, the selected subset of data record in the data storage being scanned may not include data that indicates the origin of the data. As such, the data scanning system may correlate data across multiple data storages to identify a user account (or a geographical region/jurisdiction) associated with the data within the selected subset of data records. For example, the fingerprint generation module 206 may determine whether the data in the selected subset of data records include data values that may be a primary key to other data storages, such as a user account identifier, a chat session identifier, an email session identifier, or other types of keys (e.g., a field that is indicated as a secondary key may correlate to a primary key of another data storage). The fingerprint generation module 206 may then use the data values as a primary key to retrieve data from one or more other data storages. Based on the data retrieved from the one or more other data storages, the fingerprint generation module 206 may determine an origin of the data in the selected subset of data records.

In some embodiments, the fingerprint generation module 206 may also access and analyze metadata associated with the data storage and include the metadata in the data fingerprint. For example, the fingerprint generation module 206 may determine a name of the data storage (e.g., a database name, a table name, etc.), field names (e.g., column names) used in the data storage, a percentage of the data within the data storage that has been updated within a predetermined amount of time (e.g., a month, a year, since the data has been inserted into the data structure, etc.), the time when the data storage was last updated, and a size of the data storage (e.g., a number of records within the data storage).

In some embodiments, the fingerprint generation module 206 may include the computed attributes and the metadata in the fingerprint for a corresponding data storage, such that the fingerprint may comprise a data structure for storing these attributes and metrics. In some embodiments, the fingerprint generation module 206 may compute a single value (e.g., a probability) based on the attributes and the metadata. The single data fingerprint value may indicate a likelihood that the data storage includes the data of interest specified by the data scanning request. FIG. 3B illustrates the data fingerprints generated by the fingerprint generation module 306 for the different data storages 302-324. In this example, each of the data fingerprints include only one value (e.g., a percentage), indicating a likelihood that the data storage includes the data of interest specified by the data scanning request. For example, the fingerprint generation module 206 has determined a data fingerprint of 20% for the data storage 302 based on analyzing the subset of data records 342 and the metadata associated with the data storage 302. The fingerprint generation module 206 has determined a data fingerprint of 6% for the data storage 304 based on analyzing the subset of data records 344 and the metadata associated with the data storage 304. Similarly, the fingerprint generation module 206 has determined data fingerprints of 50%, 65%, 100%, 11%, 58%, 92%, 0%, 76%, 15%, and 90% for the data storages 306-324, respectively, based on analyzing the corresponding subsets of data records and metadata.

In some embodiments, the scanning manager 202 may compare the data fingerprint generated for each of the data storages 302-324 against a threshold to determine whether an additional scan needs to be performed for one or more of the data storages 302-324.

In some embodiments, the threshold configuration module 208 may configure one or more threshold values for processing the data scanning request based on the inputs specified in the data scanning request. The threshold value(s) may correspond to one or more values in a data fingerprint. Thus, when the data fingerprint includes only a single value (e.g., the value that indicates a likelihood that the data storage includes the data of interest specified by the data scanning request), the threshold configuration module 208 may configure a single threshold value. On the other hand, when the data fingerprint includes the attributes and metadata associated with the data storage, the threshold configuration module 208 may configure multiple threshold values, each threshold value may correspond to an attribute of the data storage. For example, the threshold configuration module 208 may configure a threshold value corresponding to the percentage of data in the subset of data records that is associated with the particular type of information (e.g., PII, health data, financial data, etc.), a threshold value corresponding to a percentage of data having a particular origin (e.g., associated with a user, associated with a particular jurisdiction, etc.), and a threshold value corresponding to a ratio between a size of the subset of data records and a size of the data storage.

Different embodiments of the threshold configuration module 208 may use different techniques to configure the threshold values. In some embodiments, the threshold configuration module 208 may include predetermined threshold values for different types of requests. For example, the threshold configuration module 208 may include a set of threshold values for requests to scan for compliance with regulations associated with each jurisdiction. The threshold configuration module 208 may include another set of threshold values for requests to access information associated with a user and a threshold for requests to remove information associated with a user (e.g., forget me requests).

In some embodiments, the threshold configuration module 208 may configure and/or adjust the threshold value(s) based on the performance priority inputs specified in the request. For example, the threshold configuration module 208 may determine lower threshold values when the inputs specify a higher importance on speed than accuracy and confidence level, whereas the threshold configuration module 208 may determine higher threshold values when the inputs specify a higher importance on accuracy and confidence level than speed.

The scanning manager 202 may then determine whether to perform an additional scan (e.g., a complete scan) for each data storage based on a comparison between the data fingerprint generated for the data storage and the threshold. For example, when the scanning manager 202 determines that the data fingerprint of a data storage exceeds the threshold, the scanning manager 202 may determine to perform an additional scan for the data storage. Conversely, when the scanning manager 202 determines that the data fingerprint of a data storage does not exceed the threshold, the scanning manager 202 may determine not to perform an additional scan for the data storage.

Referring back to FIG. 3B, assuming the threshold determined by the threshold configuration module 208 is 18%, the scanning manager 202 may determine to perform additional scans for the data storages 306, 308, 310, 314, 320, and 324 based on their data fingerprints exceeding the threshold as part of the second step of the two-step approach. To perform the additional scan for a data storage, the scanning module 210 may select additional data records (e.g., additional rows) from the data storage for scanning. In some embodiments, the scanning module 210 may scan the entire data storage when the fingerprint of the data storage exceeds the threshold. In other embodiments, the scanning module 210 may select additional subsets of data records from the data storage for scanning. The scanning module 210 may iteratively select additional subsets of data records for scanning, and generate an updated data fingerprint for the data storage based on all of the scanned records until (1) the entire data storage is scanned or (2) the updated data fingerprint falls below the threshold.

In some embodiments, the scanning module 210 may not scan the entire record when performing the additional scan of a data storage. During the initial scan of the data storage, the fingerprint generation module 206 may analyze the subset of the data records and the metadata of the data storage, and may determine which data fields (e.g., columns) within the data storage are likely associated with the data of interest. For example, the fingerprint generation module 206 may determine that a data field having a field name "product-ID" likely do not contain any personal identifiable information, health information, or financial information. On the other hand, the fingerprint generation module 206 may determine that a data field having a field name "SSN" or "credit-card number" may include personal identifiable information or financial information. Thus, the fingerprint generation module 206 may flag these fields during the analysis of the subset of data records. Thus, during the additional scan, the scanning module 210 may scan only the flagged fields of each record in the data storage to further improve the speed of the data scanning process.

Accordingly, with higher threshold values (e.g., when accuracy and confidence level being more important than speed), the data scanning module 132 may be configured to perform a higher number of thorough (e.g., complete) scan (e.g., more data storages are scanned entirely during the second step), and with lower threshold values (e.g., when speed being more important than accuracy and confidence level), the data scanning module 132 may be configured to perform a lower number of thorough (e.g., complete) scanning (e.g., less data storages are scanned entirely during the second step). This way, the data scanning system provides an efficient, yet customizable, data scanning across multiple heterogenous data structures. Furthermore, under the two-step approach as described here, the data scanning can be completed much faster than a complete scan of all of the data storages. FIG. 3C illustrates portions of the data storages that are being scanned under the two-step approach. As shown, using the threshold of 18% in the given example, only 6 out of 13 data storages have been completely scanned, while only a sample scan is performed for the remaining 7 data storages. While the scanning under the two-step approach is generally slower than the sampling scan technique, the two-step approach provides a much higher accuracy in detecting data in the data storages (e.g., 99% or above).

Figure 4:
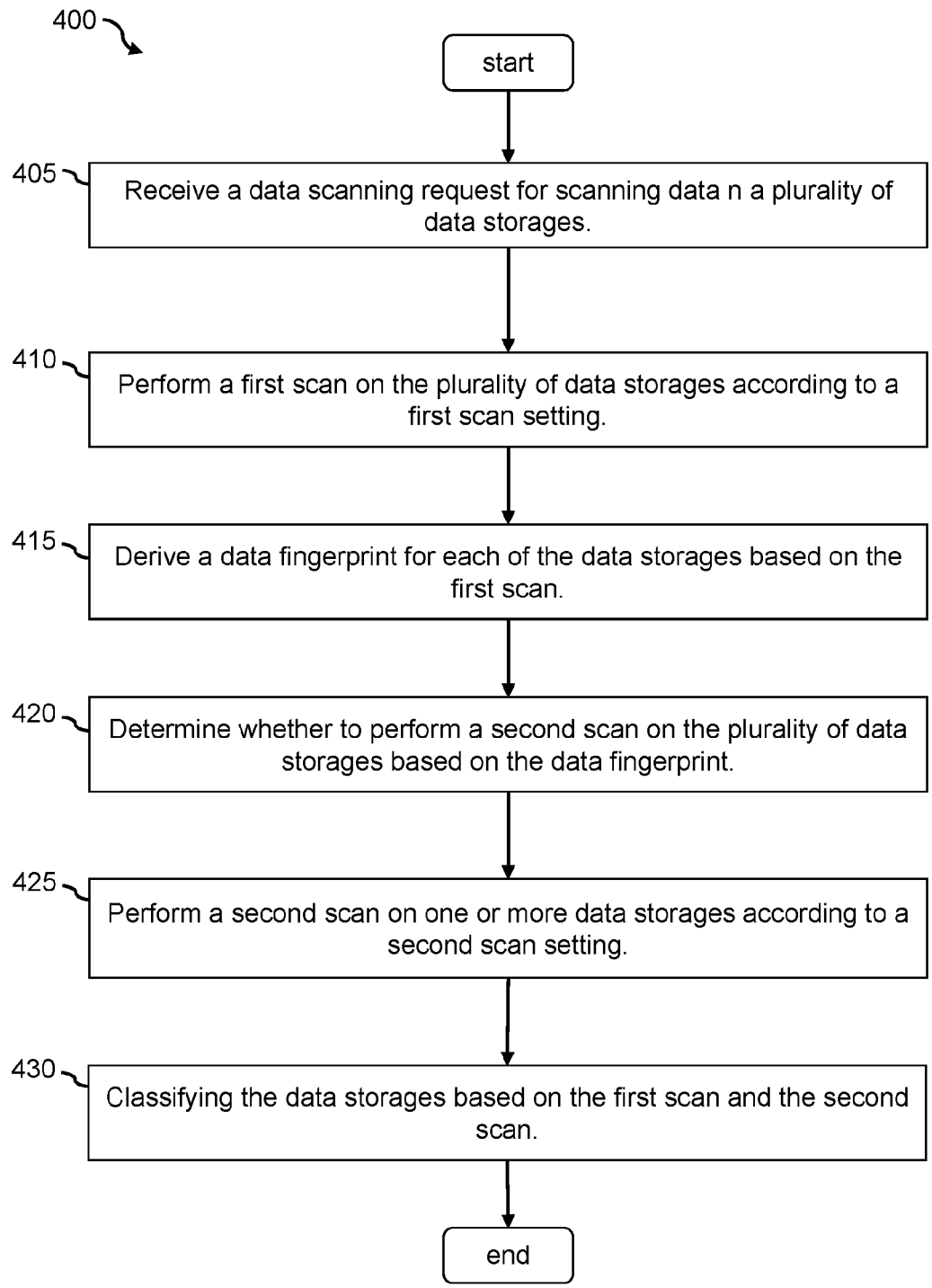
FIG. 4 is a flowchart showing a process of scanning data in a heterogenous data storage environment according to an embodiment of the present disclosure.

FIG. 4 illustrates a process 400 for scanning data in a heterogenous data storage environment according various embodiments of the disclosure. In some embodiments, at least some or all of the steps in the process 400 may be performed by the data scanning module 132. The process 400 begins by receiving (at step 405) a data scanning request for scanning data in a plurality of data storages. For example, the scanning manager 202 may receive a data scanning request from a device, such as the device 180 or the user device 110, via an interface provided by the user interface module 204. The data scanning request may be associated with verifying that the service provider server 130 is in compliance with certain data privacy regulation of a jurisdiction or a request from a customer to access and/or remove data associated with the customer. As such, the data scanning request may specify certain data (data of interest) to be detected within the data storages.

The process 400 then performs (at step 410) a first scan on the plurality of data storages according to a first scan setting to detect the data of interest within the data storages. For example, the scanning module 210 may select a subset of data records from each of the data storages 302-324 and perform a scan on only the subsets of data records. The scanning module 210 may randomly select the subset of data records based on a predetermined fixed number or percentage of data records to be selected for each data storage. In some embodiments, the scanning module 210 may use a predetermined algorithm or frequency (e.g., every $10^{th}$ record, every $100^{th}$ record, etc.) to select the subset of data records.

The process 400 then derives (at step 415) a fingerprint for each of the data storages based on the first scan. For example, for each data storage, the fingerprint generation module 206 may analyze the data within the subset of data records and the metadata associated with the data storage. The fingerprint generation module 206 may generate a data fingerprint for the data storage based on the analysis of the subset of data records and the metadata. In some embodiments, the fingerprint indicates a likelihood that the data storage includes the data of interest specified in the data scanning request.

Based on the fingerprints, the process 400 determines (at step 420) whether to perform a second scan on the plurality of data storages and performs (at step 425) a second scan on one or more data storages based on a second scan setting. For example, the scan manager 202 may compare the fingerprint generated for each of the data storages against a threshold. If the fingerprint exceeds the threshold, which indicates that it is likely that the data storage includes the data of interest, the scanning module 210 may perform an additional scan (e.g., a complete scan) of the data storage. On the other hand, if the fingerprint does not exceed the threshold, the scanning module 210 may skip (e.g., bypass) the data storage without performing the additional scan.

The process 400 then classifies (at step 430) the data storages based on the first scan and the second scan. For example, the scan manager 202 may determine that the data storages having data fingerprints that do not exceed the threshold do not include any data of interest based on the first scan. For the data storages having data fingerprints that exceed the threshold, the scan manager 202 may detect any data of interest within the data storages based on the second scan. When the data of interest is detected in a data storage, the scan manager 202 may record the data record identifier and classify the data storage as having the data of interest. In some embodiments, the scan manager 202 may transmit a report to the device that submitted the data scan request.

The report may indicate which of the data storages 302-324 and which records within the data storages includes the data of interest. The scan manager 202 may also perform an action to the data of interest, for example, removing the data of interest (or the records that include the data of interest) from the data storages.

Figure 5:
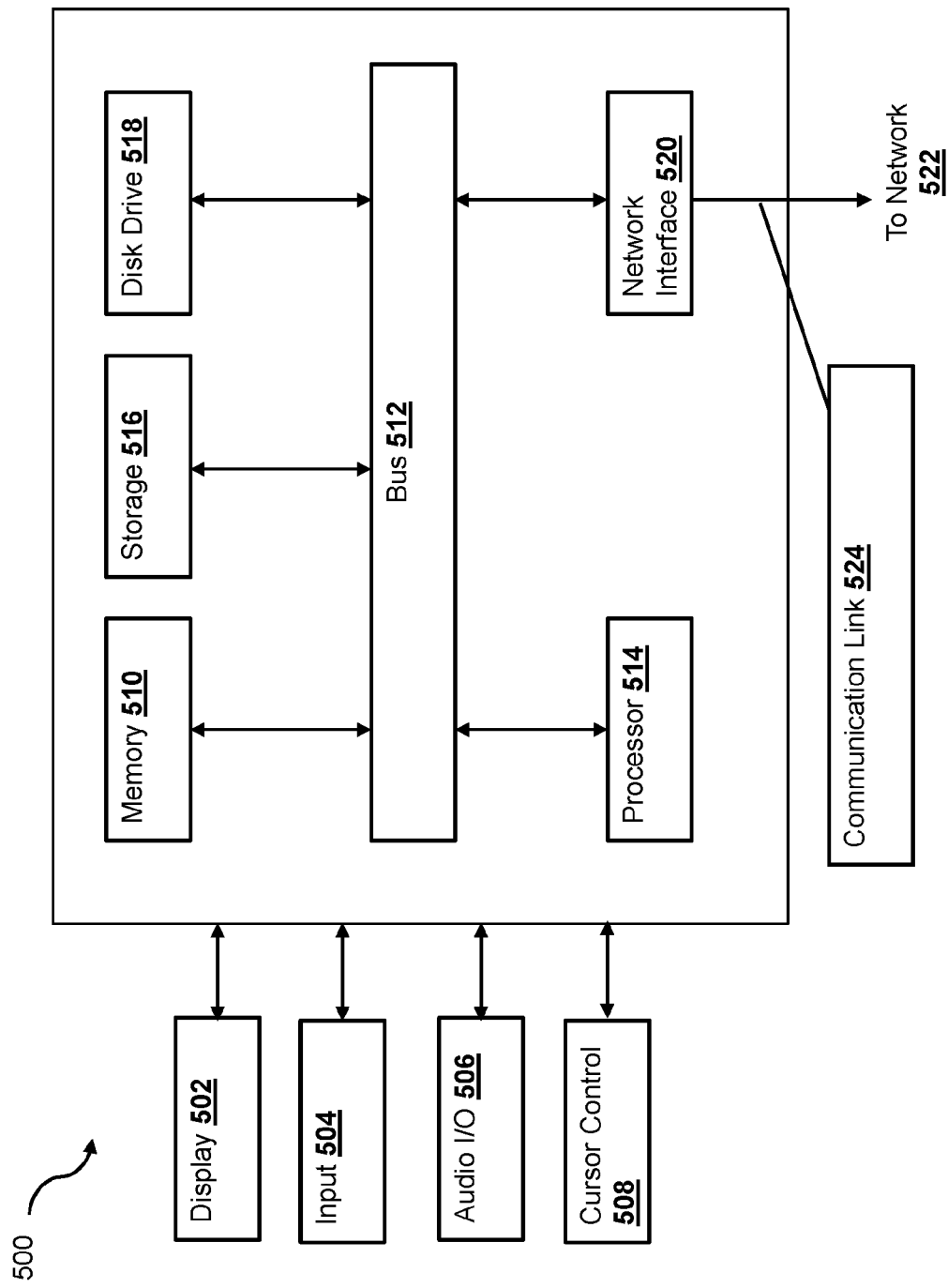
FIG. 5 is a block diagram of a system for implementing a device according to an embodiment of the present disclosure.

FIG. 5 is a block diagram of a computer system 500 suitable for implementing one or more embodiments of the present disclosure, including the service provider server 130, the user device 110, and the device 180. In various implementations, the user device 110 and/or the device 180 may include a mobile cellular phone, personal computer (PC), laptop, wearable computing device, etc. adapted for wireless communication, and the service provider server 130 may include a network computing device, such as a server. Thus, it should be appreciated that the devices 110, 180, and 130 may be implemented as the computer system 500 in a manner as follows.

The computer system 500 includes a bus 512 or other communication mechanism for communicating information data, signals, and information between various components of the computer system 500. The components include an input/output (I/O) component 504 that processes a user (i.e., sender, recipient, service provider) action, such as selecting keys from a keypad/keyboard, selecting one or more buttons or links, etc., and sends a corresponding signal to the bus 512. The I/O component 504 may also include an output component, such as a display 502 and a cursor control 508 (such as a keyboard, keypad, mouse, etc.). The display 502 may be configured to present a login page for logging into a user account, a checkout page for purchasing an item from a merchant, or a chat interface for facilitating an online chat session. An optional audio input/output component 506 may also be included to allow a user to use voice for inputting information by converting audio signals. The audio I/O component 506 may allow the user to hear audio. A transceiver or network interface 520 transmits and receives signals between the computer system 500 and other devices, such as another user device, a merchant server, or a service provider server via network 522. In one embodiment, the transmission is wireless, although other transmission mediums and methods may also be suitable. A processor 514, which can be a micro-controller, digital signal processor (DSP), or other processing component, processes these various signals, such as for display on the computer system 500 or transmission to other devices via a communication link 524. The processor 514 may also control transmission of information, such as cookies or IP addresses, to other devices.

The components of the computer system 500 also include a system memory component 510 (e.g., RAM), a static storage component 516 (e.g., ROM), and/or a disk drive 518 (e.g., a solid state drive, a hard drive). The computer system 500 performs specific operations by the processor 514 and other components by executing one or more sequences of instructions contained in the system memory component 510. For example, the processor 514 can perform the data scanning functionalities described herein according to the process 400.

Logic may be encoded in a computer readable medium, which may refer to any medium that participates in providing instructions to the processor 514 for execution. Such a medium may take many forms, including but not limited to, non-volatile media, volatile media, and transmission media. In various implementations, non-volatile media includes optical or magnetic disks, volatile media includes dynamic memory, such as the system memory component 510, and transmission media includes coaxial cables, copper wire, and fiber optics, including wires that comprise the bus 512. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 500. In various other embodiments of the present disclosure, a plurality of computer systems 500 coupled by the communication link 524 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
receiving, from a device, a request for classifying data within a first data storage;
determining a first set of criteria for scanning the first data storage based on the request, wherein the determining the first set of criteria comprises selecting, from a plurality of data records within the first data storage, a first subset of data records;
performing a first scan on the first data storage according to the first set of criteria, wherein the performing the first scan comprises scanning the first subset of data records without scanning other data records in the first data storage, identifying, within a first data record in the first subset of data records, a secondary key value corresponding to a primary key of a second data record in a second data storage, and analyzing the second data record in the second data storage;
deriving a data fingerprint for the first data storage based on the first scan, wherein the data fingerprint indicates a percentage of the data within the first data storage corresponding to a first data type;
determining whether to perform a second scan on the first data storage according to a second set of criteria based on the derived data fingerprint, wherein the second set of criteria indicates a second subset of data records from the plurality of data records being different from the first subset of data records; and
classifying the data within the first data storage as a first data classification based at least in part on the first scan and/or the second scan.

2. The system of claim 1, wherein the operations further comprise:
determining to perform the second scan on the first data storage according to the second set of criteria; and
performing the second scan on the first data storage according to the second set of criteria, wherein the performing the second scan comprises scanning the second subset of data records from the plurality of data records, wherein the classifying the data as the first data classification is further based on the second scan.

3. The system of claim 1, wherein the first subset of data records is selected from the plurality of data records based on a randomizer.

4. The system of claim 1, wherein the operations further comprise:
accessing historic classification data associated with the first data storage that was generated by a third scan performed on the first data storage prior to the receiving the request, wherein the determining whether to perform the second scan is further based on the historic classification data.

5. The system of claim 1, wherein the operations further comprise:
analyzing metadata associated with the first data storage, wherein the metadata represents at least one of a format or a structure characteristic of the first data storage, and wherein the data fingerprint is derived further based on the analyzing the metadata.

6. The system of claim 1, wherein the operations further comprise:
extracting user identification data from the second data record; and
determining a geographical region associated with the user identification data, wherein the data fingerprint is derived further based on the geographical region.

7. The system of claim 5, wherein the metadata indicates at least a field name of a field in the first data storage.

8. A method, comprising:
receiving, by one or more hardware processors from a device, a request for detecting data of interest within a plurality of databases;
performing, by the one or more hardware processors, a first scanning on a first database in the plurality of databases according to a first scan setting, wherein the performing the first scanning on the first database comprises scanning a first subset of data records within the first database without scanning other data records in the first database, identifying within a first data record in the first subset of data records, a secondary key value corresponding to a primary key of a second data record in a second database, and analyzing the second data record in the second database;
deriving, by the one or more hardware processors, a data fingerprint for the first database based on the first scanning, wherein the data fingerprint indicates a percentage of data within the first database corresponding to the data of interest;
determining, by the one or more hardware processors, whether to perform a second scanning on the first database according to a second scan setting based on the data fingerprint, wherein the second scan setting specifies a second subset of data records within the first database that is different from the first subset of data records; and
determining, by the one or more hardware processors, whether any one of the plurality of databases includes the data of interest based on the first scanning and/or the second scanning.

9. The method of claim 8, wherein the plurality of databases comprises at least one database having a structured data storage format and at least one database having an unstructured data storage format.

10. The method of claim 8, further comprising:
determining a most recent time instance when the first database has been updated, wherein the data fingerprint is derived for the first databased further based on the most recent time instance.

11. The method of claim 10, further comprising:
accessing a historic fingerprint derived for the first database after the most recent time instance, wherein the data fingerprint is derived for the first database further based on the historic fingerprint.

12. The method of claim 8, further comprising:
determining that the first database includes the data of interest; and
in response to determining that the first database includes the data of interest, performing an action to the data of interest within the first database.

13. The method of claim 12, wherein the action comprises removing the data of interest from the first database.

14. The method of claim 8, further comprising:
comparing the data fingerprint derived for the first database against a threshold, wherein the determining whether to perform the second scan is further based on the comparing.

15. A non-transitory machine-readable medium having stored thereon machine-readable instructions executable to cause a machine to perform operations comprising:
- receiving, from a device, a request for classifying data within a first data storage;
- determining a first set of criteria for scanning the first data storage based on the request, wherein the determining the first set of criteria comprises selecting, from a plurality of data records within the first data storage, a first subset of data records;
- performing a first scan on the first data storage according to the first set of criteria, wherein the performing the first scan comprises analyzing the first subset of data records without analyzing other data records in the first data storage, identifying, within a first data record in the first subset of data records, a secondary key value corresponding to a primary key of a second data record in a second data storage, and analyzing the second data record in the second data storage;
- deriving a data fingerprint for the first data storage based on the first scan, wherein the data fingerprint indicates a percentage of the data within the first data storage corresponding to a first data type;
- determining whether to perform a second scan on the first data storage according to a second set of criteria based on the derived data fingerprint, wherein the second set of criteria indicates a second subset of data records from the plurality of data records; and
- classifying the data in the first data storage as the first data classification based at least in part on the first scan and/or the second scan.

16. The non-transitory machine-readable medium of claim 15, wherein the operations further comprise:
- determining a portion of the data within the first data storage that has been modified from a particular time instance, wherein the determining whether to perform the second scan is further based on the portion of the data.

17. The non-transitory machine-readable medium of claim 15, wherein the first data classification represents that at least a portion of the data within the first data storage is of the first data type, and wherein the operations further comprise removing the at least the portion of the data from the first data storage.

18. The non-transitory machine-readable medium of claim 15, wherein the operations further comprise:
- comparing the data fingerprint against a threshold, wherein the determining whether to perform the second scan is further based on the comparing.

19. The non-transitory machine-readable medium of claim 15, wherein the operations further comprise:
- accessing historic classification data associated with the first data storage that was generated by a third scan performed on the first data storage prior to the receiving the request, wherein the determining whether to perform the second scan is further based on the historic classification data.

20. The non-transitory machine-readable medium of claim 15, wherein the operations further comprise:
- analyzing metadata associated with the first data storage, wherein the data fingerprint is derived further based on the analyzing the metadata.

* * * * *